(12) United States Patent
Loechner

(10) Patent No.: US 6,781,256 B2
(45) Date of Patent: Aug. 24, 2004

(54) LOAD VOLTAGE CONTROL FOR A FIELD DEVICE

(75) Inventor: Michael Loechner, Filderstadt (DE)

(73) Assignee: Invensys Systems, Inc., Foxboro, MA (US)

( * ) Notice: Subject to any disclaimer, the term of this patent is extended or adjusted under 35 U.S.C. 154(b) by 113 days.

(21) Appl. No.: 09/983,888

(22) Filed: Oct. 26, 2001

(65) Prior Publication Data

US 2002/0101748 A1 Aug. 1, 2002

(30) Foreign Application Priority Data

Oct. 27, 2000 (EP) .......................................... 00123341

(51) Int. Cl.[7] .................................................. H02J 3/32
(52) U.S. Cl. ...................................................... 307/46
(58) Field of Search .............................. 307/45, 46, 48, 307/126; 322/28; 363/21.06

(56) References Cited

U.S. PATENT DOCUMENTS

| | | | | |
|---|---|---|---|---|
| 5,161,097 A | * | 11/1992 | Ikeda .......................... | 323/222 |
| 5,387,857 A | * | 2/1995 | Honda et al. ................ | 320/120 |
| 5,650,669 A | * | 7/1997 | Aldous ........................ | 307/66 |
| 5,856,741 A | | 1/1999 | Hasegawa | |
| 5,880,570 A | * | 3/1999 | Tamaki et al. .............. | 318/700 |
| 5,883,484 A | * | 3/1999 | Akao .......................... | 318/700 |
| 5,959,439 A | * | 9/1999 | Shenai et al. ................ | 323/222 |
| 5,978,242 A | | 11/1999 | Raad et al. | |
| 6,075,331 A | * | 6/2000 | Ando et al. .................. | 318/376 |
| 6,265,854 B1 | * | 7/2001 | Neuteboom .................. | 323/222 |
| 6,414,403 B2 | * | 7/2002 | Kitagawa et al. ............. | 307/66 |
| 6,469,483 B2 | * | 10/2002 | Katayama .................... | 323/282 |

FOREIGN PATENT DOCUMENTS

| EP | 0540903 A1 | 10/1992 | ........... G05B/19/04 |
|---|---|---|---|
| EP | 0944160 A1 | 3/1998 | .......... H02M/3/158 |

OTHER PUBLICATIONS

European Patent Office, European Search Report, Mar. 6, 2001, 00123341.0–1239.

* cited by examiner

Primary Examiner—Gregory J. Toatley, Jr.
(74) Attorney, Agent, or Firm—Fish & Richardson P.C.

(57) ABSTRACT

To enable a relatively constant output voltage at a DC/DC converter of a field device during a predictable time after shut-down of energy supplied to the DC/DC converter there is proposed a load voltage controller having a comparison unit adapted to compare the load voltage signal (Uo) with an externally supplied load voltage reference signal (Uref). When the load voltage (Uo) exceeds the load voltage reference signal (Uref) an energy buffer stores supplied energy for subsequent resupply to the load of the field device.

31 Claims, 8 Drawing Sheets

LOAD VOLTAGE CONTROL FOR A FIELD DEVICE

TECHNICAL FIELD

The present invention relates to controlling a load voltage for a field device in a way that has stable behavior under shut down circumstances.

BACKGROUND

A load voltage controller for a field device may be used in a manufacturing process to monitor the operation of the process and to actuate process variables of the process. Typically, actuators are placed in the manufacturing field to drive different process control elements, such as valves and sensors. Further, transmitters are placed in the manufacturing field to monitor process variables, such as fluid pressure, fluid temperature or fluid flow.

Such transmitters are coupled to a control loop and transmit process information over the control loop to a centralized controller which monitors the overall operation of the manufacturing process. The control loop may be implemented as a two-wire loop carrying a current that provides power for operation of the field devices.

In such control systems, communication is typically through a field bus standard, which is a digital communication standard with which transmitters may be coupled to only a single control loop to transmit sensed process variables to the central controller. Related communication standards are described in ISA 50.02-1992 section 11. Another standard is HART® which allows digital communication to be superimposed on a 4–20 mA process variable signal.

An important aspect with respect to control systems of the type outlined above is intrinsic safety. When field devices are located in a hazardous area without explosion-proof equipment, the electronics in the field device itself should be intrinsically safe. Intrinsic safety means that the electronics must be designed in a way that no sparks and no potential heat from the components may occur even if one or more electronic failures occur at the same time. Intrinsic safety is achieved through additional protection elements designed to protect the electronics under a fault condition. Depending on the specific type of application—e.g., the explosive type of gases used within a manufacturing process—there exist different requirements for a certain design, different specifications for the protection elements, as well as different certifications.

Figure 1:
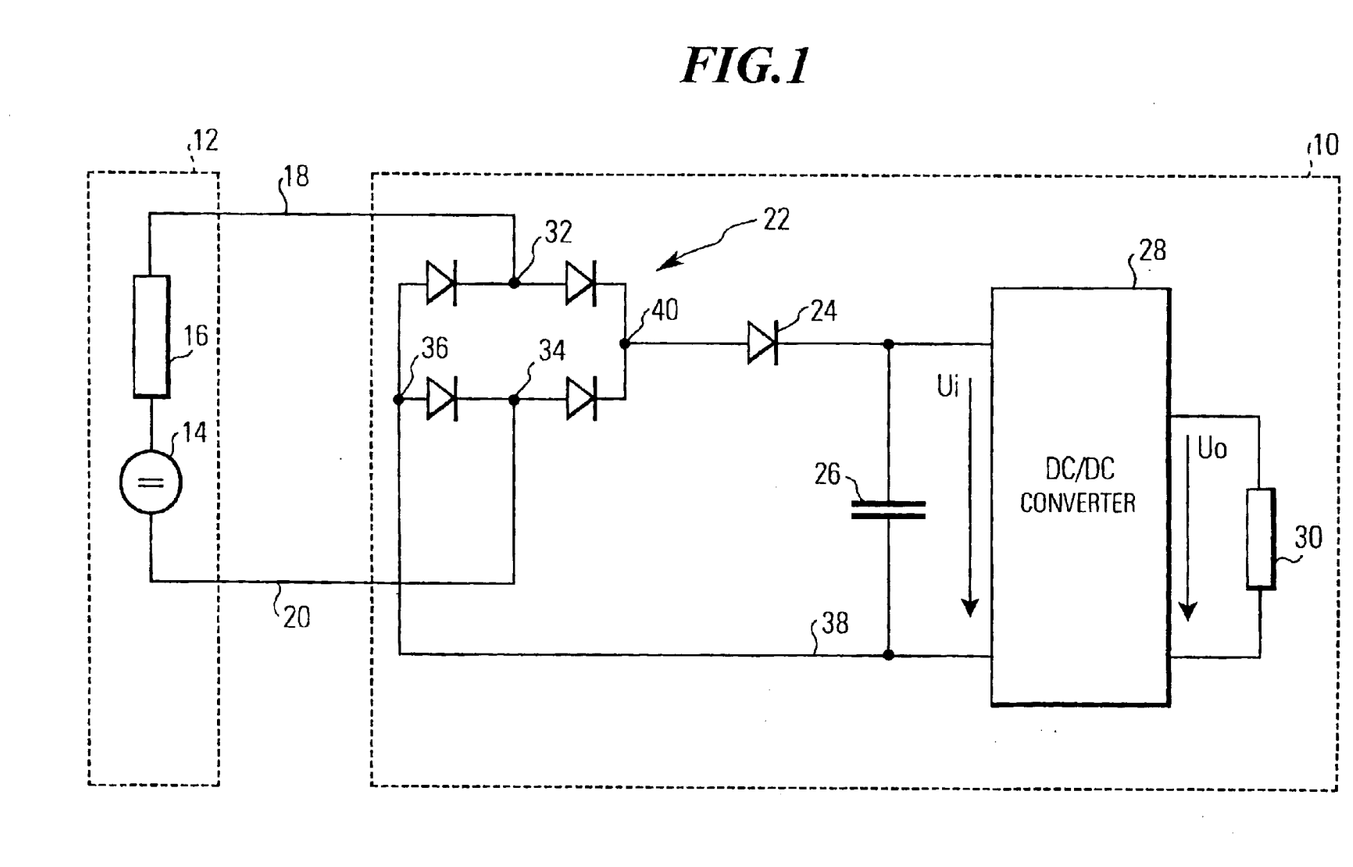
FIG. 1 shows a basic circuit diagram for a field device coupled to a fieldbus.

FIG. 1 shows further details of the field device being connected to a field bus. In particular, FIG. 1 shows elements of a single field device 10 adapted to a field bus 12.

As shown in FIG. 1, the field bus 12 may be represented by an equivalent circuit diagram with an ideal voltage source 14 and a resistor 16 to model AC voltage impedance and to fulfill intrinsic safety requirements for spark protection, current limitation and power limitation in the hazardous area.

As also shown in FIG. 1, the field device 10 is connected to the field bus 12 via a first wire 18 and a second wire 20.

As also shown in FIG. 1, the field device 10 divides into a Graetz-diode-bridge 22, a discharge protection diode 24, a capacitor 26, a DC/DC converter 28 and a load 30. The load 30 is shown as a resistor and describes an actuator operating on, e.g., a valve used in the manufacturing process or any other control element, or a transmitter being adapted to measure manufacturing process variables as outlined above.

As also shown in FIG. 1, a connection between the field device 10 and the field bus 12 is achieved by connecting the nodes 32 and 34 of the bridge arm to the first wire 18 and the second wire 20, respectively. Further, the node 36 connecting the anodes of the two upper diodes in the Graetz-diode-bridge 22 is connected to ground 38 while the node 40 connecting the cathodes of the two lower diodes of the Graetz-diode-bridge 22 is connected to the anode of the discharge protection diode 24. The cathode of the discharge protection diode 24 is connected to the capacitor 26 which itself is connected across the input terminals of the DC/DC converter 28.

Operatively, the Graetz-diode-bridge 22 in the field device 10 serves to avoid any polarity sensitivity with respect to the signal of the field bus 12. Further, the Graetz-diode-bridge 22 is provided to support intrinsic safety together with the discharge protection diode 24, e.g., when the discharge protection diode 24 fails. In other words, it is not necessary to consider polarity of the voltage on the field bus 12 when connecting the field device 10 to the field bus 12.

Also, the discharge protection diode 24 is inserted to increase the intrinsic safety of the field device 10 through blocking the discharge of capacitors comprised in the field device in the event that a circuit element of the field device fails. In other words, discharge of the effective capacitance in the field device 10 into the control loop is inhibited by an isolation network consisting of the Graetz-diode-bridge 22 and the discharge protection diode 24 with three levels of redundancy.

Further, operatively the capacitor 26 connected to the cathode of the discharge protection diode 24 serves to stabilize the input voltage Ui to the DC/DC converter 28. Therefore, if the input voltage Ui to the DC/DC converter 28 breaks down due to lack of energy supply from the field bus 12, the capacitor 26 is discharged. For this reason, the supply of energy to the DC/DC converter 28 and therefore also the load 22 will be maintained over a certain time through discharge of the capacitor 26 until the voltage across the capacitor 26 is too low to drive the DC/DC converter 28 and therefore to drive the load 30.

Figure 2:
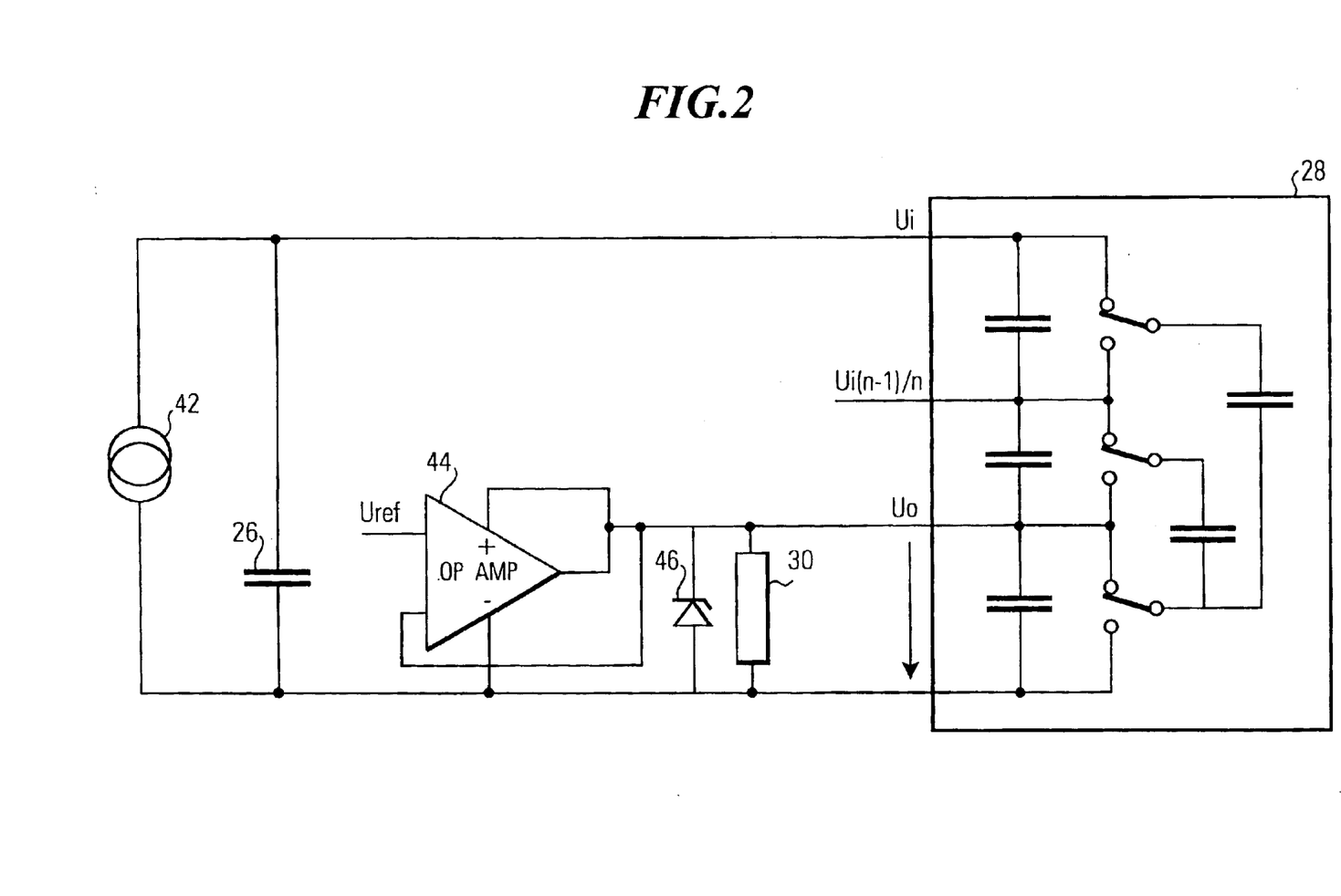
FIG. 2 shows further details of the field device shown in FIG. 1.

FIG. 2 shows further details of the field device 10 shown in FIG. 1. In FIG. 2, the elements to the left side of the capacitor 26 are summarized into an equivalent current source 42.

As shown in FIG. 2, the DC/DC converter 28 may be realized as a charge pump adapted to map the input voltage Ui, or equivalently the input current, to the DC/DC converter 28 into a suitable output voltage Uo, or equivalently the output current, over n stages.

Further, the circuit diagram shown in FIG. 2 adds an operational amplifier 44 and a Zener diode 46 to the circuit elements shown in FIG. 1.

The cathode of the Zener diode 46 is connected to the output of the DC/DC converter 28 while the anode of the Zener diode 46 is connected to ground.

Also, the positive supply of the operational amplifier 44 is the output voltage Uo of the DC/DC converter and the negative supply of the operational amplifier 44 is ground potential. The output terminal of the operational amplifier 44 is connected to the output node of the DC/DC converter 28. Further, one input terminal of the operational amplifier 44 is also connected to the output of the DC/DC converter 28 while the other input terminal of the operational amplifier 44 receives an externally supplied reference voltage signal Uref.

Operatively, the operational amplifier 44 and the Zener diode 46 are alternatives to limit the output voltage Uo of the DC/DC converter 28 to either the voltage reference Uref of the operational amplifier 44 or to the Zener diode voltage Uz of the Zener diode 46. When the Zener diode voltage Uz is higher than the voltage reference Uref of the operational amplifier 44, the Zener diode 46 may operatively achieve protection against higher voltages for overheat protection of circuit elements if the operational amplifier fails. Also, the Zener diode 46 may prevent sparks when capacitors with higher voltages are short-circuited.

As outlined above, operatively the charge pump maps the input voltage Ui or equivalently the input current into a suitable output voltage Uo or equivalently output current over n stages. As is commonly known in the art, the behavior of an ideal charge pump may be described using the following model:

| n: numbers of stages | | | |
|---|---|---|---|
| Input side | | Output side | |
| Ui: input voltage | | Uo: | output voltage |
| Ii: input current | | Io: | output current |
| Pi: input power | | Po: | output power |
| $Ui = n*Uo$ | $Ii = Io/n$ | $Pi = Po$ | (Eq. 1) |

From the above identified model, it may be derived that, since the output Uo of the DC/DC converter 28 is controlled and the input voltage Ui is predefined through the energy supply via the field bus 12, the control variable at the input terminal of the DC/DC converter 28 must be a current. This is the reason why the power source coupled to the capacitor 26 is modeled as an ideal current source 42. Further, it may be assumed that during shut-down the ideal current source 42 is switched off, as will be discussed in more detail below.

Further, operatively, the operational amplifier 44 or the Zener diode 46 acts as a bypass drawing current when the output voltage Uo of the DC/DC converter 28 exceeds the voltage reference signal Uref. As long as Uref>Uo, the current supplied by the DC/DC converter 28 flows only over the load 30. Otherwise, when Uref<Uo, the surplus current supplied by the DC/DC converter 28 flows over the bypass, i.e. from the output of the operational amplifier 44 to ground and/or over the Zener diode 46.

However, as shown in FIG. 2, the capacitor 26 storing energy to bridge an operational shut-down condition is charged with the input voltage Ui of the DC/DC converter 28. In case of power fault, the discharge current of the capacitor 26 and the voltage across the capacitor 26 will therefore be supplied to the input of the DC/DC converter 28 and then be subsequently processed over n stages in the charge pump of the DC/DC converter 28. This discharge of the capacitor 26 decreases directly the output voltage Uo of the DC/DC converter 28 until a limit value thereof is reached that causes a reset of the circuit. In other words, the output voltage of the DC/DC converter Uo decreases with the voltage across the capacitor 26 so that the reset point is reached very fast. As a result, the period during which the discharge current of the capacitor 26 may be used as an energy source for the load 30 during a shut-down/power fault on the field bus is reduced.

SUMMARY

In one general aspect, a load voltage controller for a field device includes a DC/DC converter adapted to receive a power supply voltage signal on a power supply line of the field device for conversion into a load voltage signal and subsequent supply to a load of the field device; a comparison unit adapted to compare the load voltage signal with an externally supplied load voltage reference signal; and an energy buffer adapted to store supplied energy when an output signal of the comparison unit indicates that the load voltage signal exceeds the load voltage reference signal.

The load voltage controller may be used to provide a constant load voltage for a predictable time after shut-down of the energy supply to the DC/DC converter in order to run a procedure for shut-down under stable circumstances. In some implementations, the overall capacitance in the field device may be reduced while the buffer time is increased.

In general, the buffer time available for the field device is not determined by the input current/voltage to the DC/DC converter but through the capacity of the energy buffer and the amount of energy supplied thereto. Therefore, through the provision of the energy buffer, the operation of the field device becomes more reliable and stable under a shut-down condition. Still further, it is possible to avoid any loss of energy in case the output voltage of the DC/DC converter exceeds the load voltage reference signal, which may result in an overall better energy management in the field device.

As a result, the load side provision of an energy buffer and the supply of energy thereto can be combined with a multilevel redundancy network isolation scheme such as is discussed above with respect to FIG. 1 without requiring any modifications of the hardware at the input side of the DC/DC converter.

In addition, the energy buffer may be adapted to supply energy to the load of the field device when the output signal of the comparison unit indicates that the load voltage signal is lower than the load voltage reference signal. This leads to the advantage that the energy stored in the energy buffer is only withdrawn when the load voltage signal is actually lower than the load voltage reference signal. Therefore, the energy buffer is always supplied with energy to the maximum extent without waste of energy.

In another general aspect, a switching unit is connected between the output of the DC/DC converter and the energy buffer and processes the output signal of the comparison unit to establish a connection between the DC/DC converter and the energy buffer when the load voltage reference signal exceeds the load voltage signal for supply of energy from the energy buffer to the load of the field device; disconnects the DC/DC converter and the energy buffer when the load voltage reference signal equals the load voltage signal; and establishes a current path between the energy buffer and the power supply line of the field device when the load voltage reference signal is lower than the load voltage signal for supply of energy from the energy supply line to the energy buffer.

The provision of a current switching unit between the output of the DC/DC converter and the energy buffer allows achievement of a three state operation of the load voltage controller through continuous comparison of the load voltage signal and the load voltage reference signal in the comparison unit. Energy may be stored in or supplied from the energy buffer without delay in compliance with the comparison result. Also, in case the load voltage signal exceeds the load voltage reference signal, the DC/DC converter supplies energy to the load while simultaneously storing energy in the energy buffer through the power voltage signal, thus achieving a parallel operation in the load voltage controller for preparation for subsequent shut-down conditions.

A bypass may coupled across the energy buffer for overvoltage protection to ensure operability of the load voltage controller and to draw the overcurrent not being supplied to the load.

The comparison unit and the switching unit may be realized in an integrated manner as a first operational amplifier having the power supply voltage signal on the power supply line as positive supply and the load voltage signal as negative supply and receiving the load voltage reference signal and load voltage signal as input signals, respectively. This solution allows the use of minimal amount of extra hardware, i.e. using only one additional operational amplifier and one capacitor and Zener diode. Therefore, the overall capacitance in the field device is reduced while the buffer time is still long. Also, a relatively constant output voltage is assured for a predictable time after shut-down of the input energy supply to run a procedure for shut-down handling under stable circumstances. Here, the predictable time depends on the output load current in relation to the additional capacitor of the load voltage controller. Another particular feature of this implementation is that the load voltage controller always uses the difference between the input voltage to the DC/DC converter and the output voltage for energy supply to the energy buffer.

In some implementations, the DC/DC converter may be a charge pump with at least two stages, the charge pump being adapted to provide at least one intermediate voltage signal with respect to each stage having a voltage level lying between the power supply voltage signal and the load voltage signal, respectively; and the comparison unit and the switching unit are realized in an integrated manner as a second operational amplifier having the power supply voltage signal on the power supply line as a positive supply and the at least one intermediate voltage signal of the charge pump as a negative supply, and receiving the load voltage reference signal and the at least one intermediate voltage signal as input signals, respectively.

This implementation allows further fine-tuning of the predictable time after shut-down, since this time also depends on the voltage level of the charge pump stages that may be discharged. In other words, access to the different stages of the charge pump permits modification of the predictable time for stable operation after a shut-down.

The comparison unit and the switching unit may be realized in an integrated manner as a third operational amplifier; the DC/DC converter may be a charge pump with at least two stages, the charge pump being adapted to provide intermediate voltage signals with respect to each stage having a voltage level lying between the power supply voltage signal and the load voltage signal, respectively; a first multiplexer is provided for selection of either the power supply voltage signal on the power supply line or one of the intermediate voltage signals as positive supply of the third operational amplifier; a second multiplexer is provided for selection of either one of the intermediate voltage signals or the load voltage signal as negative supply of the third operational amplifier; and the third operational amplifier receives the load voltage reference signal and the output signal of the second multiplexer as input signals, respectively. The reference voltage of the third operational amplifier is switched in relation to the positive supply voltage of the third operational amplifier.

This implementation achieves the same advantages as outlined above with respect to the implementations using the first operational amplifier and the second operational amplifier, respectively. Also, use of a first multiplexer and a second multiplexer permits modification of the positive supply and the negative supply of the third operational amplifier and also the signal to be compared with the load voltage reference signal so that an overall more flexible adaptation of the predictable time after shut-down, e.g., in dependence of external requirements is achievable.

Similar advantages may be achieved employing other systems in conjunction with techniques and methods such as those implemented by the systems described above.

In yet another general aspect a computer program product directly loadable into the internal memory of a load voltage microcontroller includes software code portions for controlling load control techniques when the product is run on the load voltage microcontroller. The microcontroller measures the voltage of the buffer capacitor and determines the multiplexer channel.

These techniques are also provided to achieve an implementation of the method steps on computer or processor systems. In conclusion, such implementation leads to the provision of computer program products for use with a load voltage control microcomputer.

The programs defining the functions of the present system can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard drives; or information convey to a computer/processor through communication media such as network and/or telephone networks and/or internet via modems or other interface devices. It should be understood that such media, when carrying processor readable instructions implementing the described concepts represent alternate implementations of the system.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

The best mode of carrying out the present system as well as various implementations thereof will be described with reference to FIGS. 3 to 8 in the following. In so far as the same or corresponding elements are shown in these figures as previously described with respect to FIGS. 1 and 2 the same reference numerals will be used and the explanation thereof will be omitted.

Figure 3:
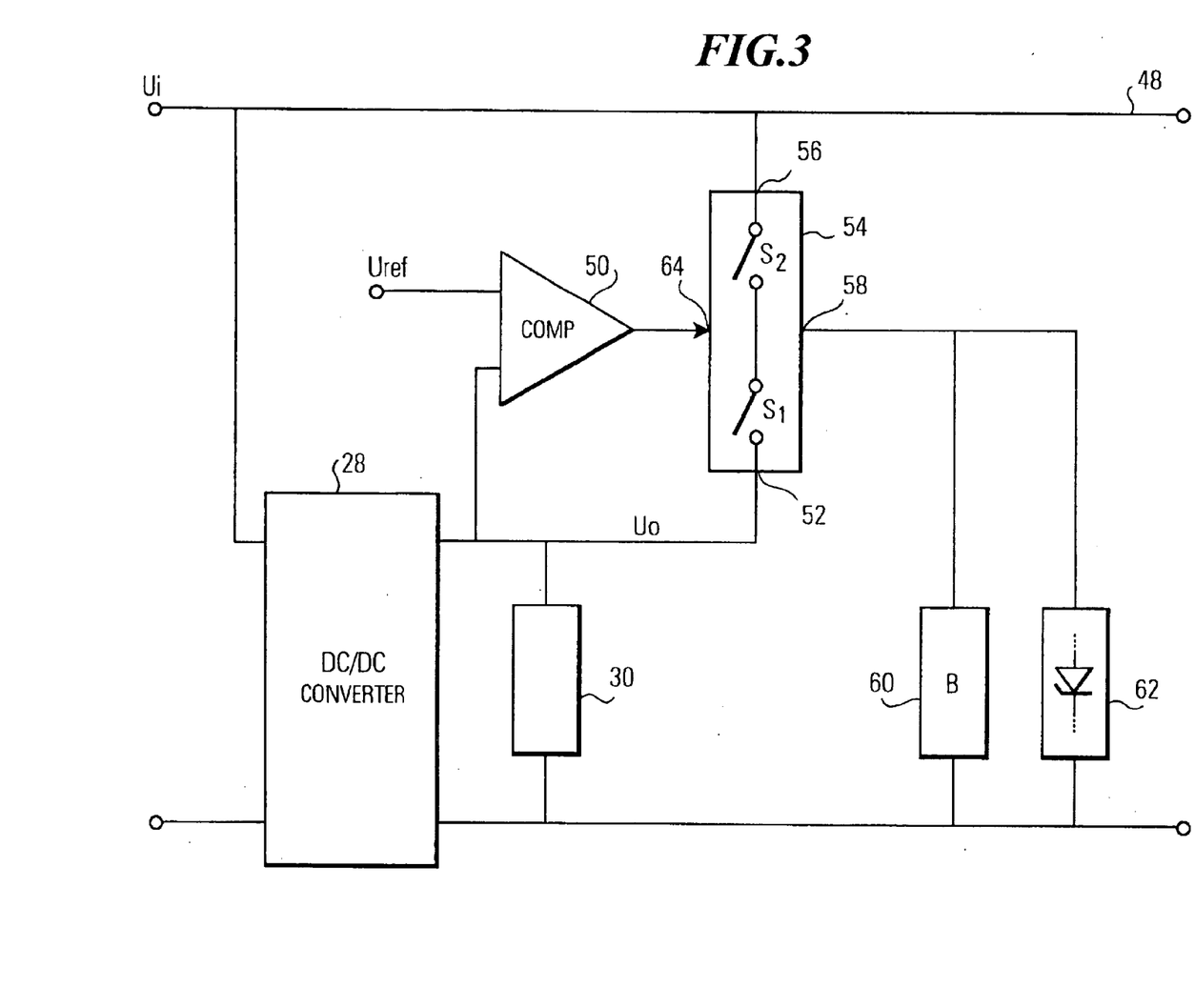
FIG. 3 shows a basic circuit diagram of a load voltage controller.

FIG. 3 shows a basic circuit diagram of a load voltage controller. As shown in FIG. 3, an input voltage Ui is supplied to the DC/DC converter 28 through a power supply line 48 being connected to the ideal current source shown in FIG. 2. At the output of the DC/DC converter 28 there is connected the load 30. Also, the load voltage signal Uo is branched off for supply to a comparator 50 that also receives a load voltage reference signal Uref at its second input terminal for comparison of these two voltage input signals.

As also shown in FIG. 3, the output of the DC/DC converter 28 is connected to a first input terminal 52 of a multistate switch 54. The second input terminal of the multistate switch 54 is connected to the power supply line 48. Further, the output terminal 58 of the multistate switch 54 is connected to a first terminal of an energy buffer 60 and a first terminal of a bypass 62 coupled across the energy buffer 60. The second terminals of the energy buffer 60 and the bypass 62 are connected to ground, respectively. Still further, the control terminal 64 of the multistate switch 54 is connected to the output terminal of the comparator 50.

Figure 4:
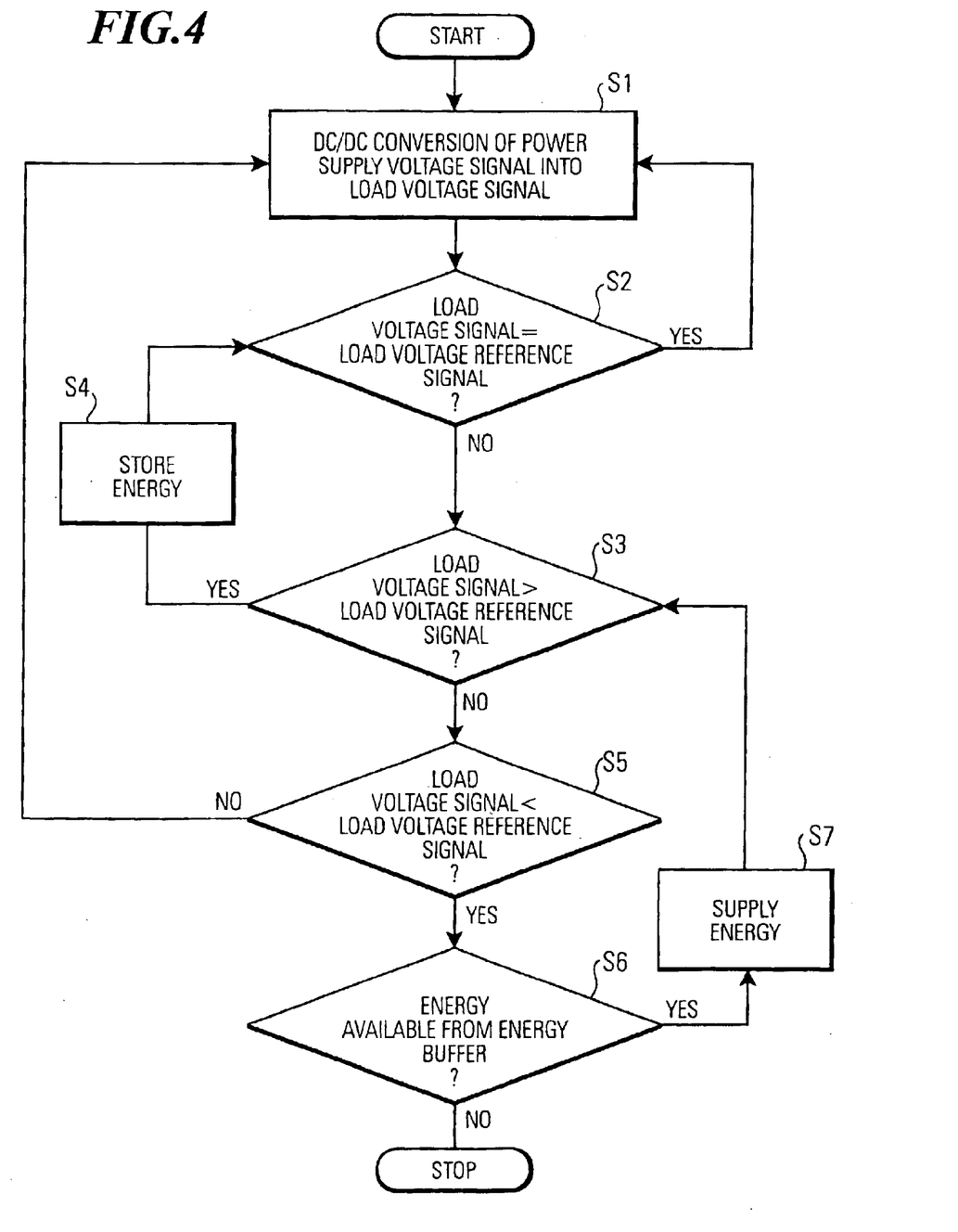
FIG. 4 shows a flow chart of the load voltage controller method.

The operation of the load voltage controller shown in FIG. 3 will be explained with reference to FIG. 4 showing a flow chart of the load voltage control method according to one implementation.

Operatively, the behavior of the multistate switch 54 is defined in dependence of the output signal on the comparator 50 as follows:

$$S = \begin{cases} U_{ref} > U_O & S1 \text{ closed, } S2 \text{ open} & (a) \\ U_{ref} = U_O & S1 \text{ open, } S2 \text{ open} & (b) \\ U_{ref} < U_O & S1 \text{ open, } S2 \text{ closed} & (c) \end{cases} \quad \text{(Eq. 2)}$$

This definition of the operation of the multistate switch 54 in dependence on the output signal of the comparator 50 leads to the operation of the load voltage controller as shown in FIG. 4.

Firstly, the DC/DC conversion of the power supply voltage signal Ui into the load voltage signal Uo is started in step S1.

Then, immediately after start of the DC/DC conversion there follows an interrogation whether the load voltage signal Uo equals the load voltage reference signal Uref in step S2. Here, if the interrogation in step S2 is affirmative, the DC/DC conversion is continued without any modification of the energy buffer. Otherwise, in case the interrogation in step S2 is negative, there follows a second interrogation in step S3 whether the load voltage signal exceeds the load voltage reference signal.

If the second interrogation in step S3 is affirmative, energy is stored into the energy buffer in step S4 and subsequently the first interrogation in step S2 is repeated.

If the second interrogation in step S3 is negative, there follows a third interrogation in step S5 to check whether the load voltage signal is lower than the load voltage reference signal. When this is not the case, both load voltage signal and load reference signal are equal and the process returns to step S1 for continuous DC/DC conversion.

Otherwise, there follows a fourth interrogation S6 to check whether energy is available from the energy buffer. If this is the case, energy is supplied from the energy buffer in step S7 and subsequently the second interrogation in step S3 is repeated.

While FIG. 4 shows the interrogation whether the load signal exceeds the load voltage reference signal in step S3 after supply of energy in step S6 an alternative would be to go back to the first interrogation in step S2 to check whether the load voltage signal equals the load voltage reference signal in step S2 (not shown in FIG. 4).

As shown in FIG. 4, if no energy is available from the energy buffer the overall load voltage control procedure comes to an end due to lack of energy for operation of the load of the field device.

Figure 5:
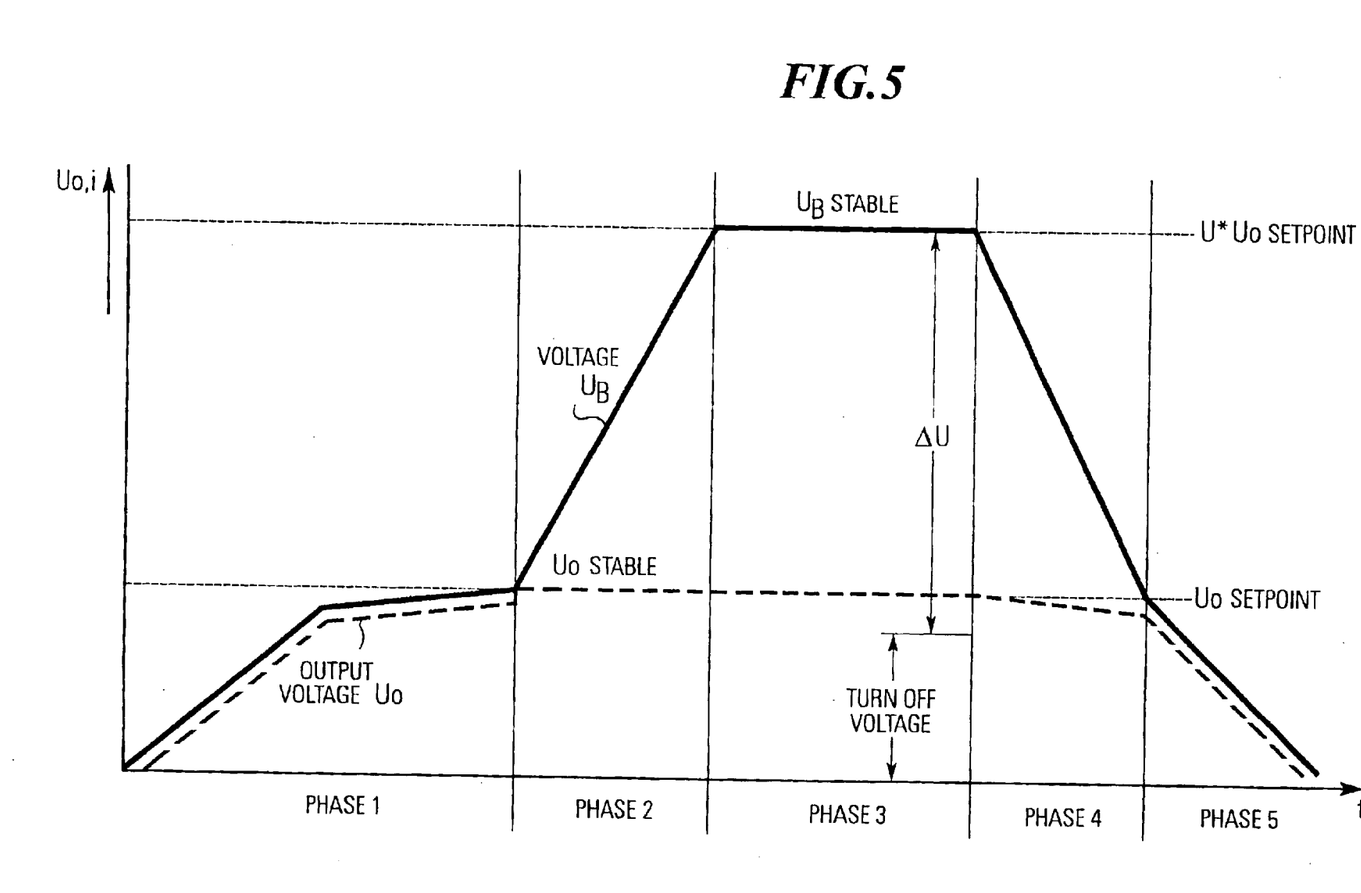
FIG. 5 shows an example of operation for the load voltage controller and related load voltage control method as shown in FIG. 3 and FIG. 4, respectively.

FIG. 5 shows an example of operation for the load voltage controller and the related load voltage control method as shown in FIGS. 3 and 4, respectively. Heretofore, in FIG. 5 there is introduced the further reference numeral UB for the voltage across the energy buffer, DU for the difference between the voltage across the energy buffer and a turn off voltage where the control operation is terminated due to lack of supply of energy to the load and an Uo setpoint as a target value for a stable load voltage signal.

Further, as shown in FIG. 5 the operation of the load voltage controller and the related load voltage control method may be divided into a plurality of phases 1 to 5 according to the ramp up of the load voltage signal (phase 1), further ramp up of the voltage across the energy buffer UB with a stable load voltage signal (phase 2), a period with stable voltage across the energy buffer and across the load (phase 3)—the overcurrent not being supplied to the load is flowing over the bypass 62—a period with declining voltage across the energy buffer during supply of energy to the load within approximately constant voltage across the load (phase 4), and simultaneous decline of the voltage across the energy buffer and the load (phase 5).

As shown in FIG. 5, during phase 1 the load voltage signal supplied by the DC/DC converter is lower than the load voltage setpoint. Therefore, according to state (a) of (Eq. 2) the multistage switch 54 has a closed first switch S1 and an opened second switch S2. The output current from the DC/DC converter 28 is supplied simultaneously to the load 30 and to the energy buffer 60. This leads to a parallel increase of the load voltage signal Uo and the voltage UB across the energy buffer 60.

As also shown in FIG. 5, after an instant of time where Uo=UB holds true with both the first switch S1 and the second switch S2 of the multistate switch 54 being opened, there follows a phase 2 where the load voltage signal of the DC/DC converter 28 is stable while energy is continuously supplied to the energy buffer 60 thus leading to an increase of the voltage across the energy buffer UB.

In more detail, this charging of energy into the energy buffer 60 is achieved by selectively switching the multistate switch 54 between the three different states (a) to (c) defined in (Eq. 2). At the beginning of phase 2, Uref equals Uo holds true so that the first switch S1 and the second switch S2 of the multistate switch 54 are open, state (b). Therefore, current is continuously supplied from the DC/DC converter until Uref<Uo holds true, state (c). At this point in time the second switch S2 of the multistate switch 54 is closed so that the energy buffer 60 is charged from the power supply line 48.

Hereafter (due to consumption of power in the load 22) the load voltage signal Uo will again drop below Uref, state (a), so that the second switch S2 of the multistate switch 54 is again opened and the first switch S1 is again closed leading to a repeated charge of the load 30 and the energy buffer 60 through the DC/DC converter 28.

Hereafter, a transition from the switching state (a), Uref>Uo, to Uref=Uo (b), further to Uref<Uo, state (c) will occur over and again leading to a further charge of the energy buffer 60.

In conclusion, a continuous switching between the different states (a)→(b)→(c)→(b)→(a)→ . . . of the multistate switch 54 leads to a charge of the energy buffer 60 while keeping the load voltage signal Uo at the output of the DC/DC converter 28 constant.

As also shown in FIG. 5, there follows a phase 3 where the energy stored in the energy buffer 60 may no longer increase due to the restricted power supply signals on the power supply line 48. The voltage UB of the energy buffer 60 remains constant.

If the voltage Ub of the energy buffer 60 would become equal to Ui, then no current could flow into the energy buffer 60 and the voltage Uo would increase with the additional current flowing to the output load. Additional charge must be bypassed to the energy buffer 60 to keep the voltage Uo stable. The buffer voltage limiter (overvoltage protection) must be lower than the voltage Ui to enable its current flow from Ui to the bypass element (e.g. a Zener diode). In this phase 3 of the diagram shown in FIG. 5 the bypass 62 holds the voltage Ub constant and a little bit lower than the voltage Ui.

As also shown in FIG. 5, in case of shutdown there follows a phase 4 of operation with a relatively constant load voltage signal Uo and a continuous discharge of the energy buffer 60. Here, during a certain time period after shutdown on the fieldbus there will occur a situation where Uref>Uo, state (a). Therefore, the first switch S1 of the multistate switch 54 is closed and the second switch S2 of the multistate switch 54 is opened and charge is supplied from the energy buffer 60 to the load 30, state (b), until either Uref=Uo, state (b), or Uref<Uo, state (c). This charging of the load 30 through the energy buffer 60 leads to a decrease of energy stored in the energy buffer 60 and a related decrease of the voltage UB across the energy buffer. However, as long as still enough energy is stored in the energy buffer 60 the load voltage signal Uo across the load 30 may be held relatively stable through switching between the states (a)→(b)→(c)→(b)→ . . . for continuous supply of energy from the energy buffer 60 to the load 30.

As shown in FIG. 5, at a certain point in time at the beginning of phase 5 the energy buffer 60 is discharged to a level a little bit lower than the load voltage reference signal Uref so that the load voltage signal Uo and the voltage UB across the energy buffer 60 are ramped down.

Assuming that the energy buffer has an equivalent capacitance C the charge stored in the energy buffer is Q=C×Uc. Therefore, the duration of phase 4 ΔT may be derived from the following equations 3 and 4:

$$\Delta T \cdot I_{load} = [t2-t1] \times I_{load} = C[Uc(t2)-Uc(t1)] = C \times \Delta Uc \quad \text{(Eq. 3)}$$

$$\Delta T = \frac{C \cdot \Delta U_c}{I_{load}} = \frac{C \cdot \Delta U_c \cdot R_L}{U_O} \quad \text{(Eq. 4)}$$

In (Eq. 3) and (Eq. 4) Uc is the voltage across the energy buffer 60, e.g., across a capacitor if the energy buffer is realized with a capacitor. A maximum of this voltage is a voltage across the bypass 62, e.g., across a Zener diode, and a minimum of this voltage is the load voltage reference signal. The maximum of this voltage is related to the maximum amount of energy storable in the energy buffer 60 and the minimum of this voltage is related to the shutdown due to lack of supply of energy.

From (Eq. 3) and (Eq. 4) it may be concluded that the time period ΔT depends on the output load current Iload in relation to the equivalent capacitance Cb of the energy buffer 60 and also relates to the energy buffer voltage difference ΔU=Uc−Uref.

In the following, more detailed circuit diagrams for the load voltage controller according to the present invention will be explained with reference to FIGS. 6 to 8. In these figures, elements being identical or corresponding to those previously discussed with respect to FIGS. 1 to 3 are denoted using the same reference numerals and explanation thereof will be omitted.

Figure 6:
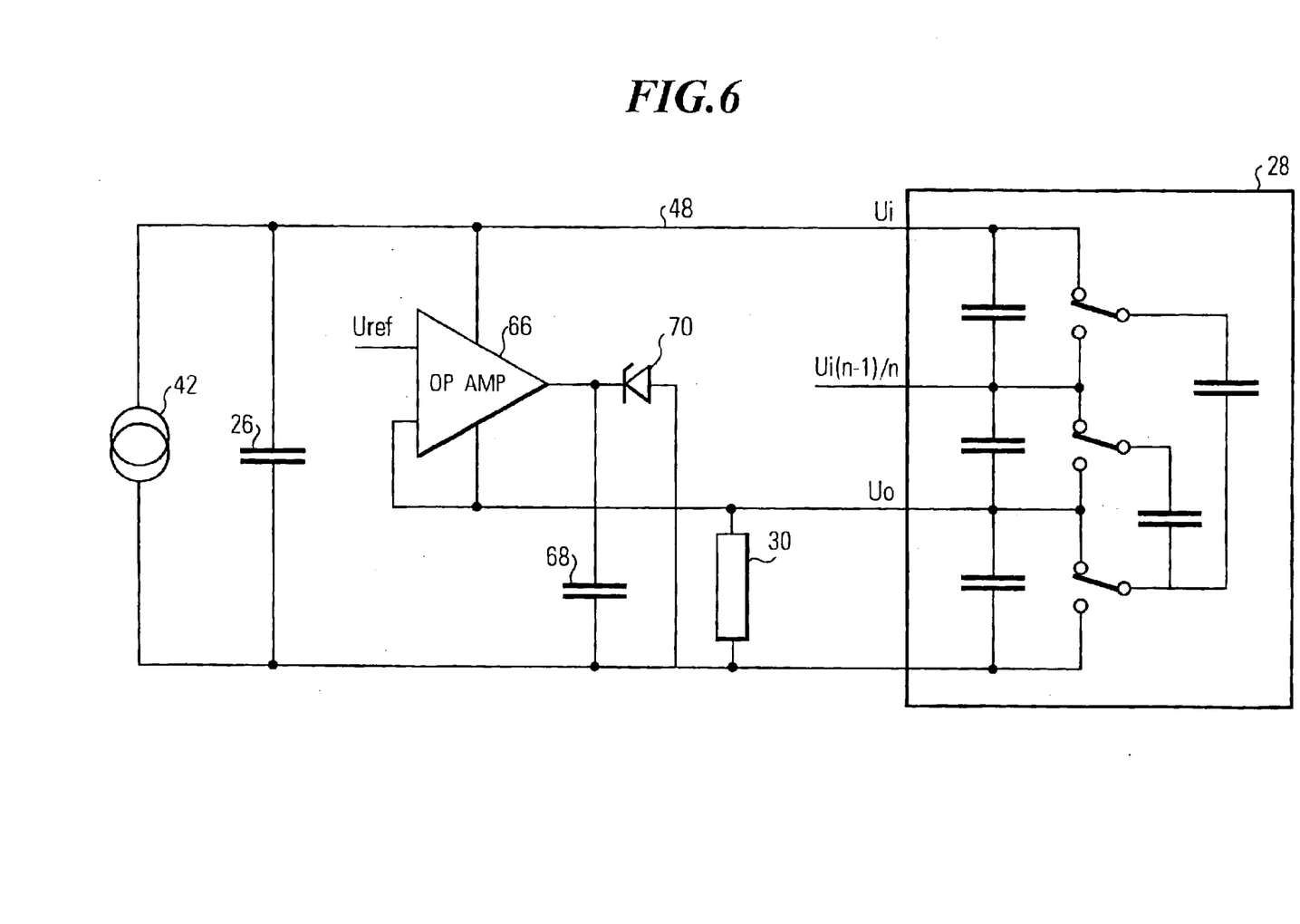
FIG. 6 shows a detailed circuit diagram for the load voltage controller.

As shown in FIG. 6, the load voltage controller uses a charge pump as DC/DC converter 28 to supply a load voltage signal Uo to a load 30. The comparator 50 and the multistate switch 54 outlined above are realized in an integrated manner as a first operational amplifier 66 having the power supply voltage signal Ui on the power supply line 48 as positive supply in the load voltage signal Uo at the output of the DC/DC converter as negative supply. The first operational amplifier 66 receives the load voltage reference signal Uref and the load voltage signal Uo as input signals for comparison. In addition, at the output of the first operational amplifier 66 a capacitor 68 branches off to ground and realizes the energy buffer 60. Still further, the cathode of the Zener diode 70 acting as overload protection is also connected to the output terminal of the first operational amplifier 66 and the anode thereof is connected to ground.

As outlined above with respect to FIG. 5, operatively the capacitor 68 may be charged with the power supply voltage signal Ui. In case of shut-down the input current source 42 may in the best case be discharged until its voltage reaches Uo while the load voltage signal Uo at the output of the DC/DC converter 28 remains constant up to this point in time. In this case the charge and discharge of the capacitor 68 is achieved between the voltage signal levels Ui and Uo.

Further, the charge current for the capacitor 68 is directly a part of the current on the power supply line 48 Ii and not Ii*n. The discharge current is directly a part of Io. Therefore, the circuit shown in FIG. 6 is a bypass to the DC/DC converter where only a part of the input current Ii is forwarded to the output current Io and the power effectiveness is reduced. This bypass is only active during the starting phase of the charge pump in the DC/DC converter 28 when the load voltage signal Uo reaches the load voltage reference signal Uref.

From that point in time forward when the load voltage signal Uo has reached the setpoint until the voltage across the capacitor 68 reaches the maximum value or Ui, the bypass becomes only active for charging the capacitor 68, i.e. in case the field device has more power than the load 30 requires. During supply of energy to the load 30 the charge pump in the DC/DC converter 28 is operated with high effectiveness, as usual.

Considering the above, the buffer time may be calculated according to the following (Eq. 5) where UD is the maximum voltage across the bypass:

$$\Delta T1 = Cb^*(U_D - U_o)/Io \quad \text{(Eq. 5)}$$

In case the bypass is realized using an ideal Zener diode UD=Ui holds true and equation (5) may be rearranged into the following equation (6).

$$\Delta T1 = Cb^*(n-1)^*Ui/(n^*Io) \quad \text{(Eq. 6)}$$

Figure 7:
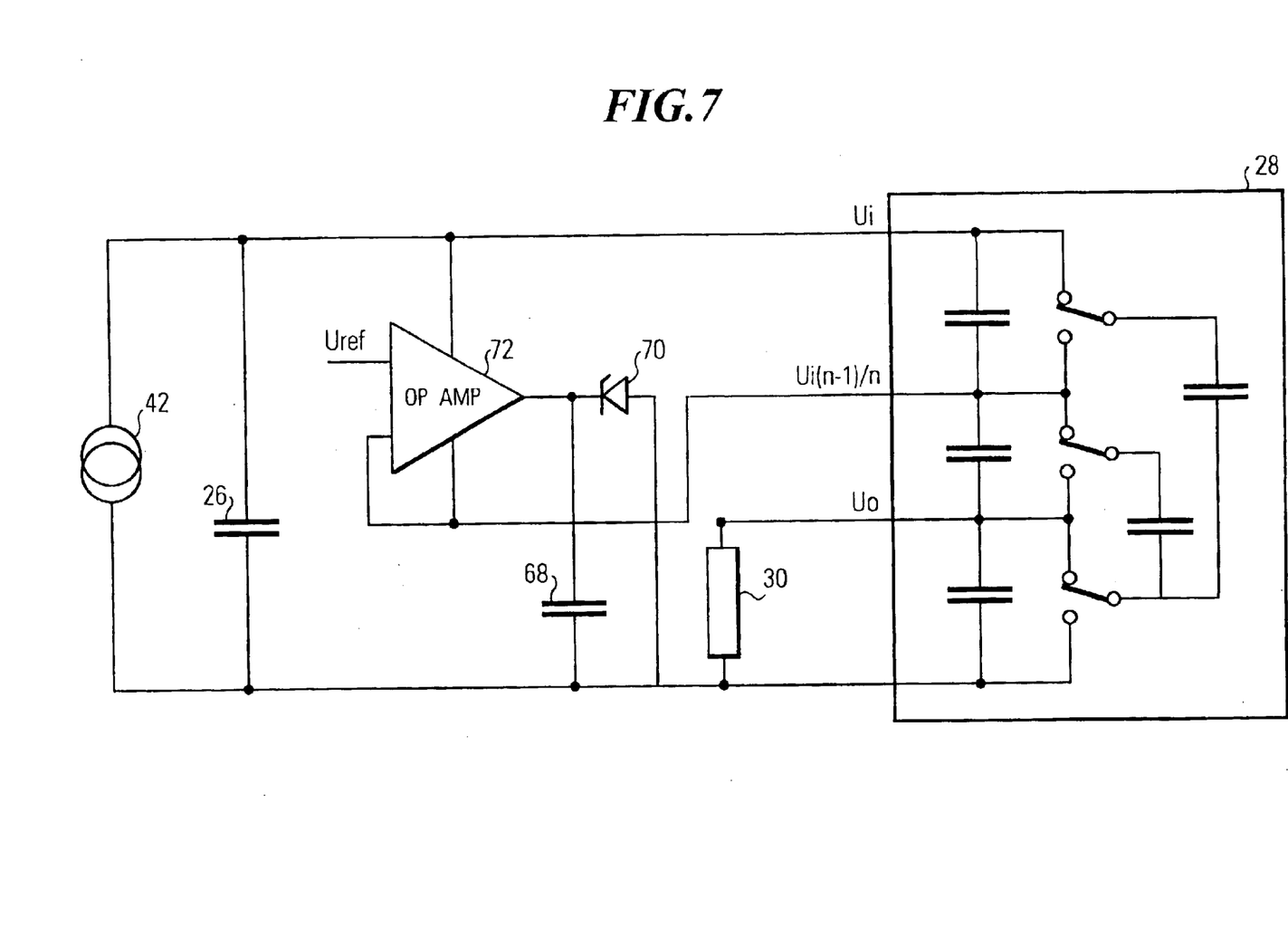
FIG. 7 shows a detailed circuit diagram for another load voltage controller.

FIG. 7 shows a detailed circuit diagram of the load voltage controller according to another implementation. Again, elements identical or corresponding to the one previously discussed are denoted using the same reference numerals and the explanation will be omitted.

As shown in FIG. 7, the DC/DC converter 28 is again realized as charge pump with at least n stages. The charge pump is adapted to provide at least one intermediate voltage signal Ui(n−1)/n at each stage having a voltage level lying between the power supply voltage signal Ui and the load voltage signal Uo, respectively.

As also shown in FIG. 7, the comparator 50 and the multistate switch 54 are again realized in an integrated manner as second operational amplifier 72 having a power supply voltage signal Ui on the power supply line 48 as positive supply and one of the intermediate voltage signals of the charge pump as negative supply. The second operational amplifier 72 receives the load voltage reference signal Uref and the intermediate voltage signals as input signal, respectively. The capacitor 68 as energy buffer 60 and the Zener diode 70 as overcurrent protection 62 are connected as outlined above with respect to FIG. 6.

As shown in FIG. 6, when the charge pump in the DC/DC converter 28 has more than two stages, the charge/discharge of the capacitor 68 may be controlled between other levels than only the power supply voltage signals Ui and the load voltage signal Uo. E.g., it may be controlled between Ui and Ui[n/(n−1)] and then the discharge current for the energy buffer capacitor 68 is Id=Io/(n−1). Nevertheless, the maximum voltage across the capacitor is only defined by one stage of the charge pump so that the buffer time is not increased in case of an ideal Zener diode:

$$\Delta T2 = Cb*\{Ui - Ui[(n-1)/n]\}/\{Io/(n-1)\} = Cb*(n-1)*Ui/(n*Io) = \Delta T \quad \text{(Eq. 7)}$$

Figure 8:
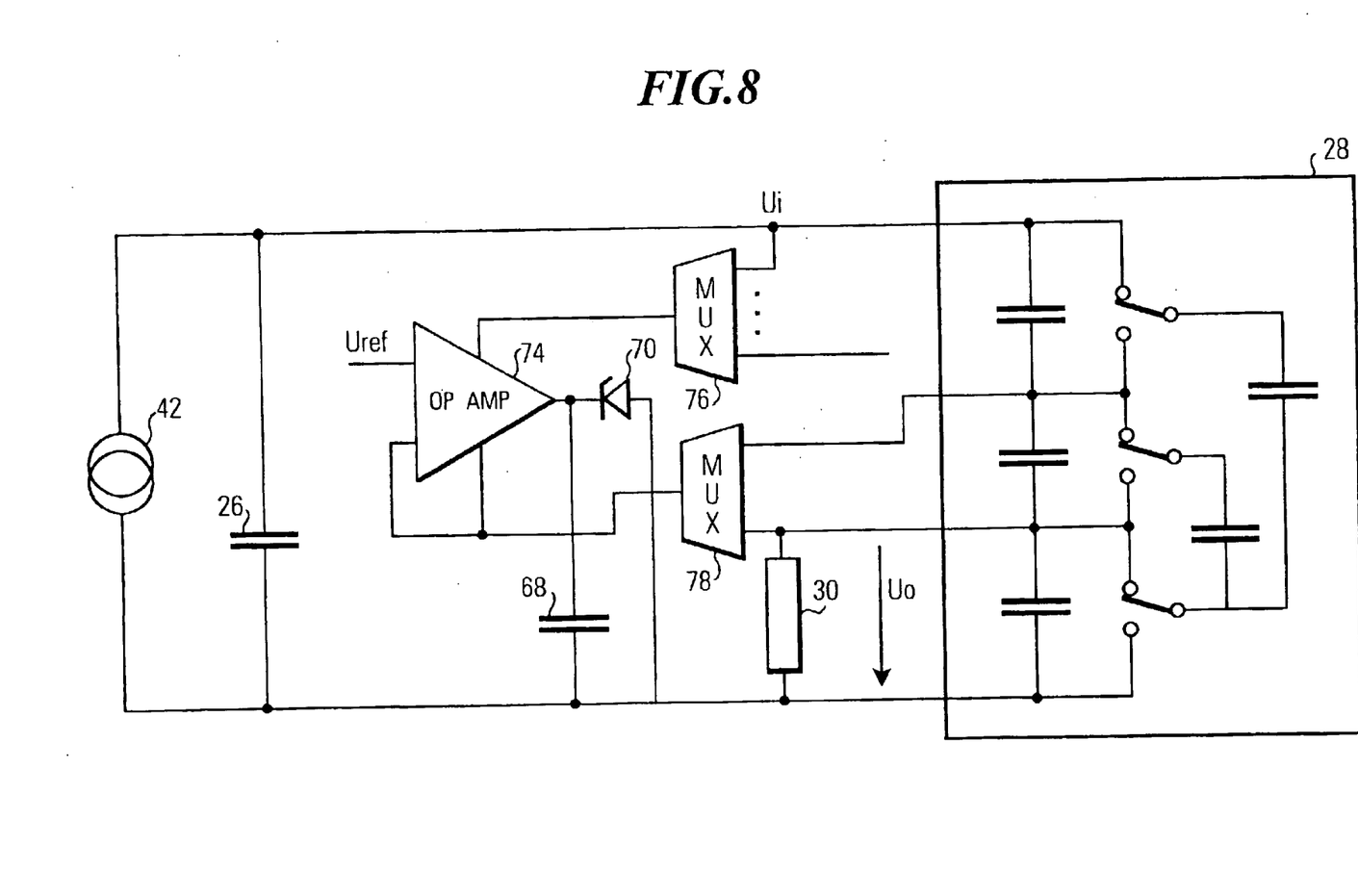
FIG. 8 shows a detailed circuit diagram for yet another load voltage controller.

FIG. 8 shows a detailed circuit diagram of a load voltage controller according to yet another implementation. Again, elements being identical or corresponding to the previously discussed elements are denoted using the same reference numerals and explanation thereof will be omitted.

As shown in FIG. 8, there is provided a third operational amplifier 74 to realize the comparator 50 in the multistate switch in integrated manner. The DC/DC converter 28 is a charge pump with a plurality of stages. The charge pump provides intermediate voltage signals with respect to each stage having a voltage lying between the power supply voltage signal Ui and the load voltage signal Uo, respectively.

A first multiplexer 76 is provided for selection of either the power supply voltage signal Ui on the power supply line 58 or one of the intermediate voltage signals as positive supply to the third operational amplifier 74.

A second multiplexer 78 is provided for selection of either one of the intermediate voltage signals or the load voltage signal Uo as negative supply for the third operational amplifier 74.

The third operational amplifier 74 further receives the load voltage reference signal Uref and the output signal of the second multiplexer 78 as input signals, respectively. The load voltage controller shown in FIG. 8 allows for an increase in the buffer time without increasing the capacitance of the capacitor 68 by switching the first multiplexer 76 and the second multiplexer 78, respectively, from stage to stage according to the following consideration:

When comparing the buffer time achievable with the implementation shown in FIG. 8 to the previous implementations shown in FIGS. 6 and 7 the related buffer times are given by the following formula $$\Delta T3 = \Delta T1 + \Delta T3 + \sum_{j=1}^{n-1} \Delta Tj$$

Here, n is a parameter identifying the different stages in the charge pump. Further, the following relations $$\Delta Tj = [U(j) - U(j-1)]*Cb/I(j-1)$$

and $$U(j) = j*Uo, \; I(j-1) = Io/(j-1), \; Uo/Io = Ro = R(\text{load})$$

may be used to express the buffer time as follows.

$$\Delta Tj = Cb\{Uo*j - Uo*(j-1)\}/[Io/(j-1)] = Cb*Ro*(j-1)$$

Thus, the buffer time for the implementation shown in FIG. 8 may be expressed as $$\Delta T3 = Cb*Ro*\sum_{j=1}^{n}(j-1)$$

When comparing this buffer time to the previously calculated buffer time DT=Cb×Ro (n−1) for a plurality of stages n=1, . . . , 10 the following results are achieved.

| e) | n | | | | | | | | |
|---|---|---|---|---|---|---|---|---|---|
| | 2 | 3 | 4 | 5 | 6 | 7 | 8 | 9 | 10 |
| ΔT2/(Cb*Ro) | 1 | 2 | 3 | 4 | 5 | 6 | 7 | 8 | 9 |
| ΔT3/(Cb*Ro) | 1 | 3 | 6 | 10 | 15 | 21 | 29 | 38 | 47 |

Therefore, according to the implementations shown in FIGS. 6 and 7, the buffer time will increase linearly with the number of stages in the charge pump. To the contrary, when using the operational amplifier together with the first multiplexer 74 and the second multiplexer 78 it is possible to extend the buffer time with a number of stages in the charge pump. The reason for this is that the amount of current drawn from the energy buffer varies with the stage being connected to either multiplexer in an increasing order from the upper stages to the lower stages of the charge pump. In the upper stages less current is drawn from the energy buffer as it will be subsequently amplified within the charge pump itself, therefore increasing the achievable buffer time.

Further, it should be noted that, for the implementation shown in FIG. 8, for each specific multiplexer channel selection there is provided a dedicated reference voltage Uref to the operational amplifier 74. One realization is that the reference voltage Uref source is connected to one of the two existing multiplexer outputs. One example is that the output of the second multiplexer 78 is connected to the minus input terminal of the operational amplifier 74 and that the reference voltage Uref source is connected to the output terminal of the first multiplexer 76. The operational amplifier will then control the reference voltage Uref and maintain it constant. Yet another opportunity is to provide a dedicated multiplexer for the provision of the voltage reference signal such that this signal is switched synchronously to the first multiplexer 76 and the second multiplexer 78 according to Uref=(m×Uo)+Uref, m=0, . . . , (m−2) with m=number of stages in the charge pump.

The load voltage controllers shown in FIG. 6 to FIG. 8 may be used with other types of power supplies differing from charge pumps, e.g., step down converters or linear regulators. As long as the load voltage controller uses the difference between the power supply voltage signal Ui and the load voltage signal Uo.

Further, it should be noted that the multistate switch 54 shown in FIG. 3 also may be substituted by an inductive step down converter to achieve high efficiency during loading and deloading (phase 2, phase 4) when the step down converter is operated with a frequency adapted to the inductance thereof by, e.g., pulse width modulation PWM. With the ratio S1 (on)/S2 (on) the ratio of the supply voltage Ui to the load voltage Uo may be determined. The advantage of such an inductive step down converter is that it may be operated continuously which allows a better adaptation to the required application. A further advantage is that the efficiency during the phase 2 and 4 shown in FIG. 5 is improved thus leading to a longer buffer time after shut down of the power supply. On the other hand, the application of a charge pump is more cost effective and requires less space while electromagnetic fields are not emitted so that any influence on components sensitive to such electromagnetic fields is easily avoided. Further, an inductive step down converter would require additional protective diodes to avoid sparks and further a molding of the windings to avoid a breakage of the inductance in the step down converter, to achieve intrinsic safety.

Also, while the above implementations have been described by referring to the circuit diagram providing several implementations for the load voltage controller, it should be noted that clearly the described techniques may also be implemented digitally using a microcontroller. In this case, the techniques may be implemented as a computer program product directly loadable into the internal memory of the load voltage microcontroller comprising software code portions for implementing the load voltage control techniques.

A number of implementations have been described. Nevertheless, it will be understood that various modifications may be made.

What is claimed is:

1. A load voltage controller for a field device, comprising:
   a DC/DC converter adapted to receive a power supply voltage signal (Ui) on a power supply line of the field device for conversion into a load voltage signal (Uo) and subsequent supply to a load of the field device;
   a comparison unit adapted to compare the load voltage signal (Uo) with an externally supplied load voltage reference signal (Uref); and
   an energy buffer adapted to store supplied energy when an output signal of the comparison unit indicates that the load voltage signal (Uo) exceeds the load voltage reference signal (Uref).

2. The voltage controller of claim 1 wherein the energy buffer is further adapted to supply energy to the load of the field device when the output signal of the comparison unit indicates that the load voltage signal (Uo) is lower than the load voltage reference signal (Uref).

3. The load voltage controller of claim 1 further comprising a switching unit connected between the output of the DC/DC converter and the energy buffer, the switching unit processing the output signal of the comparison unit to:
   establish a connection between the DC/DC converter and the energy buffer when the load voltage reference signal (Uref) exceeds the load voltage signal (Uo) for supply of energy from the energy buffer to the load of the field device;
   disconnect the DC/DC converter and the energy buffer when the load voltage reference signal (Uref) equals the load voltage signal (Uo); and
   establish a current path between the energy buffer and the power supply line of the field device when the load voltage reference signal (Uref) is lower than the load voltage signal (Uo) for supply of energy from the energy supply line to the energy buffer.

4. The load voltage controller of claim 2 further comprising a switching unit connected between the output of the DC/DC converter and the energy buffer, the switching unit processing the output signal of the comparison unit to:
   establish a connection between the DC/DC converter and the energy buffer when the load voltage reference signal (Uref) exceeds the load voltage signal (Uo) for supply of energy from the energy buffer to the load of the field device;
   disconnect the DC/DC converter and the energy buffer when the load voltage reference signal (Uref) equals the load voltage signal (Uo); and
   establish a current path between the energy buffer and the power supply line of the field device when the load voltage reference signal (Uref) is lower than the load voltage signal (Uo) for supply of energy from the energy supply line to the energy buffer.

5. The load voltage controller of claim 1 further comprising a bypass unit coupled across the energy buffer for overvoltage protection and to sink overcurrent.

6. The load voltage controller of claim 2 further comprising a bypass unit coupled across the energy buffer for overvoltage protection and to sink overcurrent.

7. The load voltage controller of claim 3 further comprising a bypass unit coupled across the energt buffer for overvoltage protection and to sink overcurrent.

8. The load voltage controller of claim 3 wherein the comparison unit and the switching unit are realized in an integrated manner as a first operational amplifier having the power supply voltage signal (Ui) on the power supply line as positive supply and the load voltage signal (Uo) as negative supply and receiving the load voltage reference signal (Uref) and load voltage signal (Uo) as input signals, respectively.

9. The load voltage controller of claim 5 wherein the comparison unit and the switching unit are realized in an integrated manner as a first operational amplifier having the power supply voltage signal (Ui) on the power supply line as positive supply and the load voltage signal (Uo) as negative supply and receiving the load voltage reference signal (Uref) and load voltage signal (Uo) as input signals, respectively.

10. The load voltage controller of claim 3 wherein:
    the DC/DC converter is a charge pump with at least two stages, the charge pump being adapted to provide at least one intermediate voltage signal with respect to each stage having a voltage level lying between the power supply voltage signal (Ui) and the load voltage signal (Uo), respectively; and
    the comparison unit and the switching unit are realized in an integrated manner as a second operational amplifier having the power supply voltage signal (Ui) on the power supply line as positive supply and the at least one intermediate voltage signal of the charge pump as negative supply and receiving the load voltage reference signal (Uref) and the at least one intermediate voltage signal as input signals, respectively.

11. The load voltage controller of claim 5 wherein:
    the DC/DC converter is charge pump with at least two stages, the charge pump being adapted to provide at least one intermediate voltage signal with respect to each stage having a voltage level lying between the power supply voltage signal (Ui) and the load voltage signal (Uo), respectively; and the comparison unit and the switching unit are realized in an integrated manner as a second operational amplifier having the power supply voltage signal (Ui) on the power supply line as positive supply and the at least one intermediate voltage signal of the charge pump as negative supply and receiving the load voltage reference signal (Uref) and the at least one intermediate voltage signal as input signals, respectively.

12. The load voltage controller claim 3 wherein:

the comparison unit and the switching unit are realized in an integrated manner as a third operational amplifier;

the DC/DC converter is a charge pump with at least two stages, the charge pump being adapted to provide intermediate voltage signals with respect to each stage having a voltage level lying between the power supply voltage signal (Ui) and the load voltage signal (Uo), respectively;

a first multiplexer operable to select either the power supply voltage signal (Ui) on the power supply line or one of the intermediate voltage signals as positive supply of the third operational amplifier;

a second multiplexer operable to select either one of the intermediate voltage signals or the load voltage signal (Uo) as negative supply of the third operational amplifier; and the third operational amplifier receives the load voltage reference signal (Uref) and the output signal of the second multiplexer as input signals, respectively; wherein the load voltage reference signal (Uref) of the third operational amplifier is switched in relation to the positive supply voltage of the third operational amplifier.

13. The load voltage controller claim 5 wherein:

the comparison unit and the switching unit are realized in an integrated manner as a third operational amplifier;

the DC/DC converter is a charge pump with at least two stages, the charge pump being adapted to provide intermediate voltage signals with respect to each stage having a voltage level lying between the power supply voltage signal (Ui) and the load voltage signal (Uo), respectively;

a first multiplexer operable to select either the power supply voltage signal (Ui) on the power supply line or one of the intermediate voltage signals as positive supply of the third operational amplifier;

a second multiplexer operable to select either one of the intermediate voltage signals or the load voltage signal (Uo) as negative supply of the third operational amplifier; and the third operational amplifier receives the load voltage reference signal (Uref) and the output signal of the second multiplexer as input signals, respectively; wherein the load voltage reference signal (Uref) of the third operational amplifier is switched in relation to the positive supply voltage of the third operational amplifier.

14. The load voltage controller of claim 8 wherein the energy buffer comprises a capacitor connected between an output terminal of the first, second or third operational amplifier and ground.

15. The load voltage controller of claim 10 wherein the energy buffer comprises a capacitor connected between an output terminal of the first, second or third operational amplifier and ground.

16. The load voltage controller of claim 12 wherein the energy buffer comprises a capacitor connected between an output terminal of the first, second or third operational amplifier and ground.

17. The load voltage controller of claim 8 wherein the bypass unit comprises a current sink element such as a Zener diode or a fourth operational amplifier having a reference voltage being lower than the input voltage to the DC/DC converter.

18. The load voltage controller of claim 10 wherein the bypass unit comprises a current sink element such as a Zener diode or a fourth operational amplifier having a reference voltage being lower than the input voltage to the DC/DC converter.

19. The load voltage controller of claim 12 wherein the bypass unit comprises a current sink element such as a Zener diode or a fourth operational amplifier having a reference voltage being lower than the input voltage to the DC/DC converter.

20. The load voltage controller of claim 14 wherein the bypass unit comprises a current sink element such as a Zener diode or a fourth operational amplifier having a reference voltage being lower than the input voltage to the DC/DC converter.

21. A load voltage control method for a field device comprising:

receiving a power supply voltage signal (Ui) on a power supply line of the field device for conversion into a load voltage signal (Uo) and subsequent supply of the load voltage signal (Uo) to a load of the field device;

comparing the load voltage signal (Uo) with an externally supplied load voltage reference signal (Uref); and storing energy being supplied through the power supply line in an energy buffer when the load voltage signal (Uo) exceeds the load voltage reference signal (Uref).

22. The load voltage control method of claim 21 wherein stored energy is supplied from the energy buffer to the load of the field device when the load voltage signal (Uo) is lower than the load voltage reference signal (Uref).

23. The load voltage control method of claim 21 wherein the energy buffer is disconnected from the load of the field device when the load voltage reference signal (Uref) equals the load voltage signal (Uo).

24. The load voltage control method of claim 22 wherein the energy buffer is disconnected from the load of the field device when the load voltage reference signal (Uref) equals the load voltage signal (Uo).

25. A load voltage control method for a field device including computer software running on a load voltage processor, the method comprising:

loading the computer software into a memory associated with the load voltage processor;

receiving a power supply voltage signal (Ui) on a power supply line of the field device for conversion into a load voltage signal (Uo) and subsequent supply of the load voltage signal (Uo) to a load of the field device;

comparing the load voltage signal (Uo) with an externally supplied load voltage reference signal (Uref); and storing energy being supplied through the power supply line in an energy buffer when the load voltage signal (Uo) exceeds the load voltage reference signal (Uref).

26. The load voltage control method of claim 25 wherein stored energy is supplied from the energy buffer to the load of the field device when the load voltage signal (Uo) is lower than the load voltage reference signal (Uref).

27. The load voltage control method of claim 25 wherein the energy buffer is disconnected from the load of the field device when the load voltage reference signal (Uref) equals the load voltage signal (Uo).

28. The load voltage control method of claim 26 wherein the energy buffer is disconnected from the load of the field device when the load voltage reference signal (Uref) equals the load voltage signal (Uo).

29. The load voltage controller of claim 1 wherein the energy buffer is further adapted to supply energy to the load of the field device when the output signal of the comparison unit indicates that the load voltage signal (Uo) is lower than the load voltage reference signal (Uref) after shut down of the power supply voltage signal (Ui) to the DC/DC converter.

30. The load voltage control method of claim 21 further comprising supplying energy from the energy buffer to the load of the field device when the load voltage signal (Uo) is lower than the load voltage reference signal (Uref) after shut down of the power supply voltage signal (Ui).

31. The load voltage control method of claim 25 further comprising supplying energy from the energy buffer to the load of the field device when the load voltage signal (Uo) is lower than the load voltage reference signal (Uref) after shut down of the power supply voltage signal (Ui).

* * * * *